UNITED STATES PATENT OFFICE.

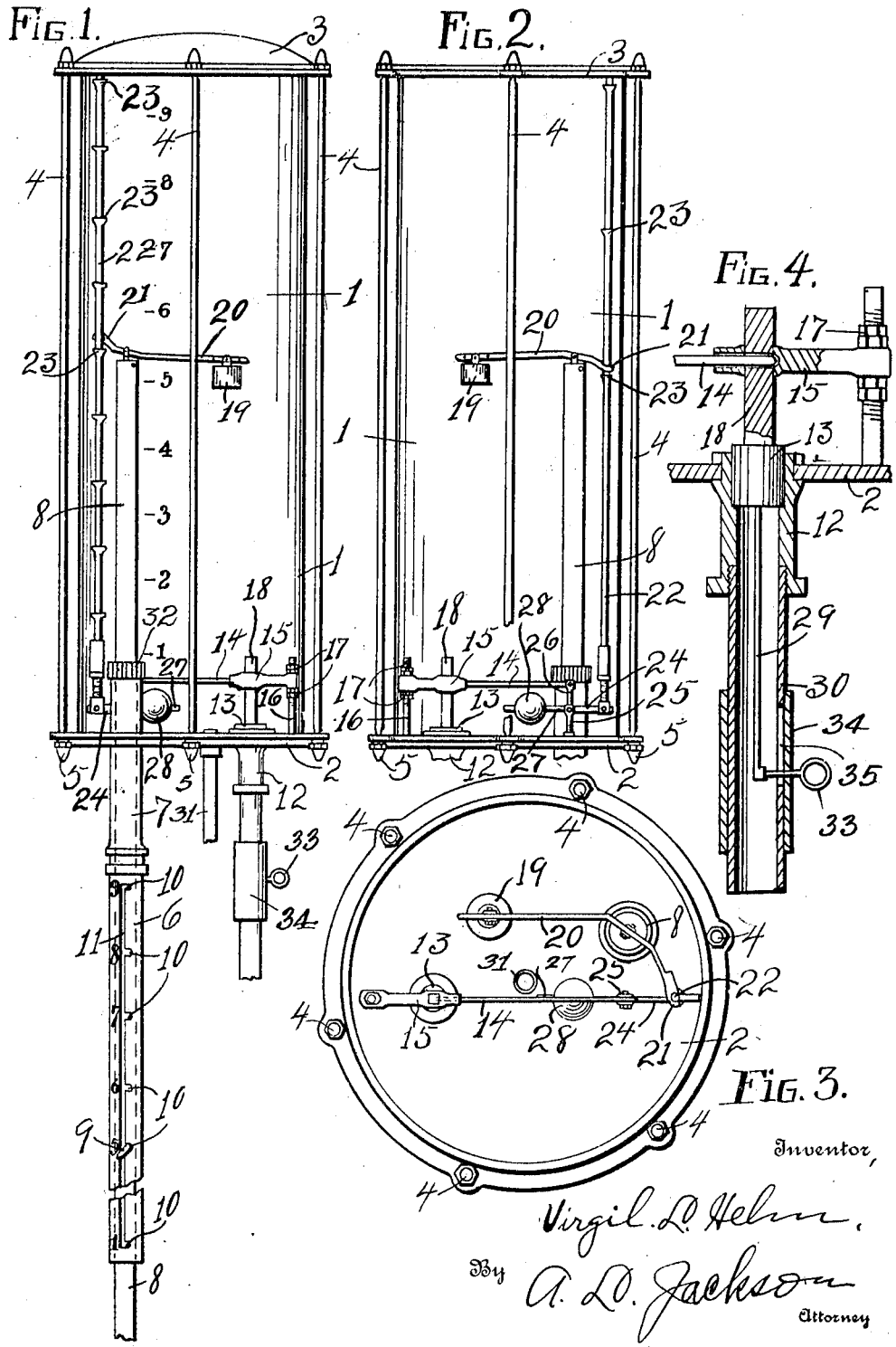

VIRGIL L. HELM, OF FORT WORTH, TEXAS, ASSIGNOR OF THREE-SIXTEENTHS TO J. J. PARKER, THREE-SIXTEENTHS TO E. R. PURDY, AND FOUR-SIXTEENTHS TO H. K. McCOLLUM, ALL OF FORT WORTH, TEXAS.

LIQUID-FUEL-MEASURING TANK.

1,270,291.   Specification of Letters Patent.   Patented June 25, 1918.

Application filed January 5, 1917. Serial No. 140,723.

*To all whom it may concern:*

Be it known that I, VIRGIL L. HELM, a citizen of the United States, residing at Fort Worth, in the county of Tarrant and State of Texas, have invented certain new and useful Improvements in Liquid-Fuel-Measuring Tanks, of which the following is a specification.

My invention relates to liquid fuel measuring tanks, and the object is to provide a simple apparatus which will measure liquid fuel accurately and to accomplish the measuring visibly in a simple manner and which will protect both the buyer and the seller against fraud and which will be automatic in action for stopping the accumulation of gasolene or other liquid fuel as soon as the desired quantity has been measured. Other objects and advantages will be fully explained in the following description and the invention will be more particularly pointed out in the claims.

Reference is had to the accompanying drawings which form a part of this application.

Figure 1 is a front elevation of the measuring tank. Fig. 2 is a rear elevation of the same. Fig. 3 is a plan view of the same, the top being removed. Fig. 4 is an enlarged vertical section of a portion of the locking mechanism.

Similar characters of reference are used to indicate the same parts throughout the several views.

In carrying out the objects of this invention a tank 1 of glass or transparent material and sealed at the bottom with a metallic base 2 and a metallic cap 3 and rods 4 are used to clamp the cap 3 and bottom 2 on the cylindrical tank 1. The base 2 may be provided with suitable supports 5. The bottom 2 is perforated to support a gage pipe 6 which is connected to a sleeve pipe 7 which passes through the bottom. An overflow pipe 8 runs up through the sleeve pipe 7 and is provided with a lug handle 9 for use in setting the overflow pipe at different heights. The gage pipe 6 is provided with notches or recesses 10 and a slot 11 into which all the recesses or notches 10 open. The lug 9 can be placed in any one of the recesses 10 to hold the overflow pipe 8 at different heights. The gage pipe 6 will have printed thereon at the different recesses a number indicating the gallons or gallons and fractional parts of a gallon corresponding to the number of gallons indicated on the tank 1. The lug 9 will be set in the recess 10 which indicates the amount of liquid fuel wanted. The pipe 7 serves as a guide for the pipe and is made permanently stationary with the bottom of the tank. A packing gland 32 is provided on the pipe 7 to prevent leaking of the gasolene. The gage pipe 6 is detachably connected to the pipe 7. A gage will be formed on the side of the tank 1 with numbers corresponding to the numbers on the pipe 6 to show the amount of fuel at the different heights in the tank. The liquid fuel will rise no higher in the tank 1 than the top of the overflow pipe which can be set at any desired height. As soon as the fuel rises in the tank as high as the top of pipe 8, the fuel will run back down the pipe 8 into the tank from which the fuel was pumped.

Means are provided to prevent any fuel from leaving the tank 1 until the desired quantity has been pumped into the tank 1 through the inlet pipe 31. The gasolene could also be pumped up through the pipe 8. A discharge pipe connection 12 is secured to the base 2. A valve 13 is mounted in the upper end of the connection 12. The valve 13 is locked in position in its seat by a key 14 and a lock 15. The lock 15 is adjustably mounted on a rod 16 by nuts 17 and is cored to receive the key 14, the rod 16 being stationary in the base 2. The valve 13 has a stem 18 which runs up through the lock 15 and the key 14 runs in the lock 15 and through the stem 18, as shown in Fig. 4. The key 14 is automatically released from the stem 18 by a float valve 19 which is suspended from a lever 20 which is fulcrumed in the upper end of the overflow pipe 8. The lever 20 has a hook 21 on the short arm thereof and a vertically movable rod 22 has shoulders or stops 23 thereon graduated to correspond with the notches 10 on the pipe 6, and also to correspond with the scale of gallons on the tank 1. When the handle 9 is swung into and out of the notches 10, the hook 21 will engage and then release respectively the rod 22. When the required amount of gasolene has been pumped into and accumulated in the tank 1, the gasolene will cause the float 19 to rise. The lever 20 will bear the rod 22 down. The rod 22 is pivotally connected to a lever 24 which is fulcrumed in the upright 25. This lever 24 has an upstanding lug or arm 26 and a horizontal arm 27 and a weight 28 on arm 27. The weight 28 will normally hold the rod 22 in its elevated position. The key 14 is pivotally connected to the upstanding arm 26 and is normally held in the locked position by the weight 28, but when the lever 20 bears the rod 22 down, the key 14 will be withdrawn from the locked position and release the valve stem 18. The valve 13 cannot be released from its seat until the key 14 is drawn out of the stem 18. When this has been done the valve 13 can be raised by elevating the depending stem 29 which action can be accomplished in any suitable manner, as hereinafter set forth. When the valve 13 is raised the gasolene which has accumulated in the tank 1 will be discharged through pipe 30 into any convenient receptacle which may be provided by the purchaser.

In operation, when a person or purchaser announces the amount of gasolene wanted or whatever fuel is in the tank 1, the pipe 8 is elevated by the handle 9, sliding in the slot 11, until the top of the pipe 8 reaches the number on the tank 1 which indicates the number of gallons wanted. Then the handle 9 is swung into the recess 10. This operation will swing the hook 21 around to engage the rod 22 just above a stop 23 which is formed on the rod so that the hook 21 can bear the rod 22 downwardly. The mechanism is now set for furnishing the required fuel. The pump (not shown) is started to pumping fuel up through the pipe 31 into the tank. The fuel will rise in the tank and about the time the required amount of fuel is pumped into the tank, the fuel will press the float 19 upwardly. This will press the lever 20 upwardly and the hook 21 downwardly and so press the rod 22 downwardly. Should more than the required amount of fuel be pumped into the tank, the excess would run back through the pipe 8 into the supply source. When the rod 22 is pressed downwardly, as above described, it will bear down on the lever 24 and draw the key 14 out of the stem 18 of the valve 13. The gasolene or other fuel can be let out of the tank by raising the valve 13 out of its seat. As soon as the fuel is let out of the tank, the weight 28 will restore the rod 22 to its normal position. The rod cannot go entirely to its normal position until the valve 13 goes by gravity back to its seat, bringing the opening in the stem in line with a key 14 at which time the weight 28 will complete the function of raising the rod 22 and forcing the key 14 through the valve stem 18.

The valve 13 is manually operated to let the fuel out of the tank. A handle 33 is provided for the rod 29 and projected through the side of the pipe 30. The pipe 30 has a slot 35 for the movement of the handle 33 and a sleeve 34 may be loosely mounted on the pipe 30 and the handle 33 projected through the sleeve 34. The sleeve will prevent escape of fuel through the slot 35.

What I claim, is,—

1. A liquid measuring tank comprising a cylindrical body of transparent material, a cap and a base and a supply pipe therefor, a discharge pipe in the base, a valve closing said discharge pipe, means within said tank for automatically locking said valve closed, an overflow and gage pipe vertically movable through said base, means for positioning said overflow pipe at any required position in said tank, and means operatively connected with said overflow pipe and with said valve for automatically releasing said valve when the required liquid is accumulated in said tank.

2. A liquid measuring tank comprising a cylindrical body of transparent material, having a scale of gallons marked thereon, a cap and a base therefor, a discharge pipe in said base, and a supply pipe, a valve for opening and closing said pipe, means for automatically locking said valve closed, an overflow gage pipe vertically movable through said base, means for positioning said gage pipe at any required position in said tank, and means operatively connected to said overflow pipe and to said valve for automatically unlocking said valve to be automatically actuated by the liquid rising in said tank.

3. A liquid measuring tank comprising a cylindrical body having a scale of gallons marked thereon, a cap and a base and a supply pipe for said body, a gage pipe vertically movable through said base, means for positioning said gage pipe in said tank relative to said scale consisting of a slotted guide pipe having notches in one side of the slot and a scale of gallons in connection with said notches corresponding to the scale of gallons on said tank and a lug rigid with said guide pipe to be placed in said notches, a discharge in said base, a valve for opening and closing said discharge provided with an upwardly projecting stem, a bracket through which said stem projects, a bolt for locking said stem in said bracket, and means operatively connected with said bolt and said gage pipe to be actuated by liquid rising in said tank for actuating said bolt to release said valve.

4. A liquid measuring tank comprising an upright body having a scale of gallons marked thereon, a cap and a base for said body, a gage pipe vertically movable through said base, means for positioning said gage pipe in said tank relative to said scale, a discharge in said base, a valve for opening and closing said discharge, means for locking said valve closed, a vertically movable rod having stops thereon registering with said scale of gallons operatively connected with said locking means, and a lever fulcrumed on said gage pipe and carrying a float on one arm and having a hook on the other arm adapted to engage said rod and the stops thereon, said lever to be actuated by liquid rising in said tank against said float.

5. A liquid measuring tank comprising an upright body having a scale of gallons marked thereon, a cap and a base for said body, a gage pipe vertically movable through said base, means for positioning said pipe in said tank relative to said scale, a discharge in said base, a valve for opening and closing said discharge and provided with an upwardly projecting stem, a stationary lock for said stem, a key for locking said stem in said lock, a vertically movable rod in said tank having stops registering with said scale, a three-armed lever fulcrumed in said tank having the main arm pivotally connected to said rod and having one arm pivotally connected to said key and carrying a weight on the third arm, and a lever fulcrumed on the upper end of said gage pipe and carrying a float on one end and having a hook on the other end adapted to engage said rod and the stops thereon, said lever to be actuated by liquid rising in said tank against said float.

In testimony whereof, I set my hand, this 14th day of December, 1916.

VIRGIL L. HELM.